JOHN P. MANNY.
Improvement in Harvester Rakes.
No. 125,747. Patented April 16, 1872.
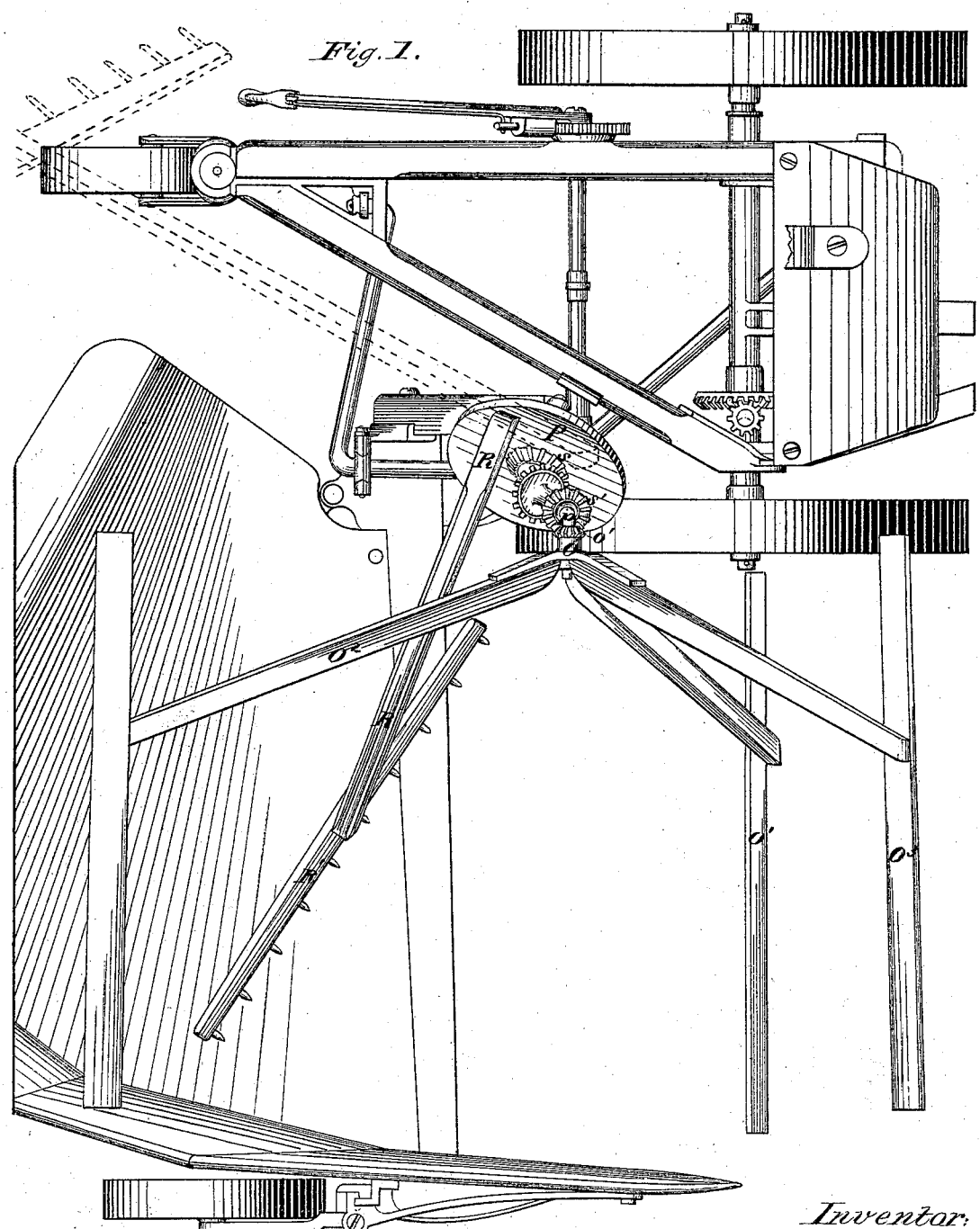

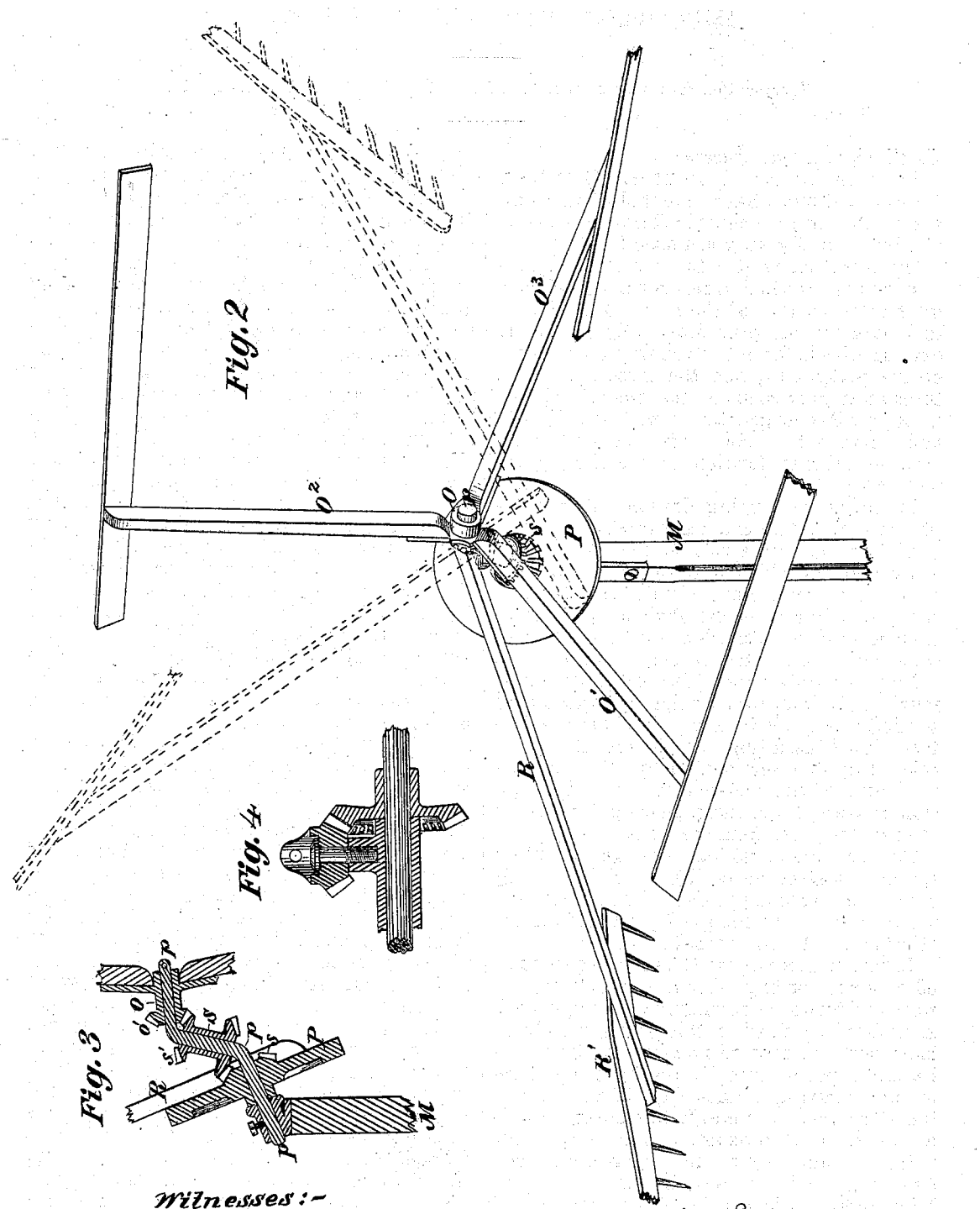

125,747

UNITED STATES PATENT OFFICE.

JOHN P. MANNY, OF ROCKFORD, ILLINOIS.

IMPROVEMENT IN HARVESTER-RAKES.

Specification forming part of Letters Patent No. 125,747, dated April 16, 1872.

*To all whom it may concern:*

Be it known that I, JOHN P. MANNY, of Rockford, Illinois, have invented certain new and useful Improvements in Harvester-Rakes, of which the following is a specification:

My invention relates to that class of harvester-rakes in which a reel revolves in a path intersected by that of the rake. Its object is to deliver the cut grain diagonally behind the driving-wheels far out of the way of the team on the next round; and the invention constitutes an improvement on the machine shown in Letters Patent granted to me March 7, 1871, and numbered 112,363. The subject-matter claimed in this application is particularly specified hereinafter.

In the accompanying drawing all the improvements herein claimed are shown as embodied in the form now best known to me in a machine for which application for Letters Patent has been made simultaneously herewith. My improvement obviously, however, may be adapted to machines differing in con- construction from that herein shown.

Figure 1 represents a plan or top view of so much of my improved machine as is necessary to illustrate the invention; Fig. 2, a perspective view illustrating the movements of the rake; Fig. 3, a sectional detail through the stud-axle of the reel-gearing; and Fig. 4, a similar view of the main gearing for driving the reel and rake from the axle.

The reeling and raking devices constituting the only subject-matter herein claimed, it is deemed unnecessary to describe the details of the machine, they being fully set forth in another application of even date herewith.

In this instance a post, M, is shown as mounted on a shoe or finger-beam, and inclining upward and forward over the inner driving-wheel. A stud-axle, $p$, fixed on this post and inclined backward and upward relatively to the finger-beam, supports a hub, P, turning freely thereon, and carrying a rake-arm, R, fixed tangentially thereon. A rake, R', is secured on this arm, so as to lie horizontally parallel with but inclined diagonally to the finger-beam when sweeping over it, as shown in Fig. 1. The hub P by preference is attached to or forms part of the gear which drives the rake. The platform is of the usual concave form shown in sundry patents heretofore granted to me, except that by recent improvements I am enabled to extend it further backward and inward than heretofore. The rake-hub is driven in any of the usual suitable well-known ways. The result of this construction of the rake is that it sweeps backward over the platform, drawing the grain off in a straight line diagonal to the finger-beam, and discharging it well behind and between the driving-wheels, with its stalks inclined to the path of the machine at a slight angle, in good position for binding. In rising to move forward again the rake moves onward toward the stubble side of the machine, passing over the caster-wheel and driver's seat, as shown by the dotted lines in Fig. 1, and at an elevation sufficient to avoid all danger of striking the driver or driving-wheel. In descending the rake-arm moves almost perpendicularly downward and across the frame and driving-wheel, thus avoiding any danger of striking the team and obviating the necessity of hitching the team further forward or outward on the machine. The rake then descends squarely into the grain close behind and in the space formed by one of the reel-ribs. The rake is so timed as not to gather the grain to the cutters, but simply to hold it, as it were, until the cutters come up to it. The rake then draws the grain diagonally off the platform, as above set forth. The rake, it will be observed, intersects the path of the reel in descending upon the platform, but moves eccentrically thereto both vertically and horizontally throughout its course. This rake can be used with any reel of ordinary construction. I have, however, found it advantageous to combine with it a reel operating in a peculiar manner, for purposes hereinafter explained. To this end I bend the stud-axle $p$ above mentioned upward and forward and then horizontally, so as to form an axle on which a reel-hub, $o$, revolves. A gear, $s$, on the face of the rake-hub P, drives a corresponding pinion on a collar, S, turning freely on the vertical part of the stud $p$. A bevel-gear, $s'$, on the upper part of this collar drives a corresponding one, $o'$, on the reel-hub, thus rotating the reel. The reel in this instance is composed of three ribs or beaters, $O^1$ $O^2$ $O^3$, revolving over the finger-beam in the usual way.

The reel and rake may be so geared as to run with equal speed. I have discovered, however, that by running the reel and rake each at a uniform speed, but with velocities differing from each other, I can increase the reeling capacity of the machine, and thus diminish the diameter of the reel while running the rake at a speed comparatively slow. In this instance the reel is geared to run one-third faster than the rake—that is, every time the rake rises out of the way of the reel a reel-rib passes it, and the rake in descending follows the rib it preceded in rising. The relative speed of the reel and rake obviously might be varied greatly.

I claim as my invention—

1. The combination of the hub, the overhung reel, the intermediate gear-collar, and the bent stud-axle on which they are mounted, the axes of the reel and hub being eccentric, substantially as set forth.

2. The combination of the stud-axle, the rake fixed on a hub revolving on the axle, and the overhung reel also mounted on the axle eccentrically to the rake, substantially as set forth.

In testimony whereof I have hereunto subscribed my name.

JOHN P. MANNY.

Witnesses:
 BALTIS DE LONG,
 EDWD. C. DAVIDSON.